US011553770B2

(12) United States Patent
Tonelli (10) Patent No.: US 11,553,770 B2
(45) Date of Patent: Jan. 17, 2023

(54) PORTABLE CONTAINER AND ASSOCIATED COUPLING ASSEMBLY

(71) Applicant: G.T. LINE S.R.L., Valsamoggia (IT)

(72) Inventor: Massimo Tonelli, Bologna (IT)

(73) Assignee: G.T. LINE S.R.L., Valsamoggia (IT)

( * ) Notice: Subject to any disclaimer, the term of this patent is extended or adjusted under 35 U.S.C. 154(b) by 828 days.

(21) Appl. No.: 16/520,482

(22) Filed: Jul. 24, 2019

(65) Prior Publication Data

US 2020/0029664 A1 Jan. 30, 2020

(30) Foreign Application Priority Data

Jul. 26, 2018 (IT) .......................... 102018000007515

(51) Int. Cl.
*A45C 5/03* (2006.01)
*A45C 5/04* (2006.01)
*F16F 9/02* (2006.01)
*E05F 3/02* (2006.01)
*F16F 9/54* (2006.01)

(52) U.S. Cl.
CPC .................. *A45C 5/03* (2013.01); *A45C 5/04* (2013.01); *E05F 3/02* (2013.01); *F16F 9/029* (2013.01); *F16F 9/54* (2013.01); *E05Y 2201/218* (2013.01); *E05Y 2900/602* (2013.01); *F16F 9/0218* (2013.01)

(58) Field of Classification Search
CPC ... E05F 3/02; A45C 13/02; A45C 5/03; A45C 5/04; A45C 13/34; F16F 9/54
See application file for complete search history.

(56) References Cited

U.S. PATENT DOCUMENTS 1,688,464 A 10/1928 Lane
2,115,656 A * 4/1938 Thompson .............. E05C 17/28
217/60 C (Continued)

FOREIGN PATENT DOCUMENTS

CN 207256194 U 4/2018
CN 212678548 U 3/2021

(Continued)

OTHER PUBLICATIONS

IT Search Report issued Apr. 15, 2019 re: Application No. 2018000007515, pp. 1-7, citing: GB 331 753 A, U.S. Pat. No. 1,688,464 A and U.S. Pat. No. 4,239,093 A.

*Primary Examiner* — John K Fristoe, Jr.
*Assistant Examiner* — Justin Caudill
(74) *Attorney, Agent, or Firm* — Cantor Colburn LLP (57) ABSTRACT

A portable container, of the type of a suitcase, a trunk, a crate, a trolley, and the like, comprising a first shell portion and a second shell portion which are mutually articulated and can move between a configuration for closing an internal compartment and at least one open configuration for free access to the compartment; a safety device is coupled to the shell portions; the container also comprises an assembly for coupling the device to at least the first shell portion; the assembly is provided with: at least two inserts which are stably inserted in respective seats a slider, coupled to the device, a profiled element which is rigidly supported by the inserts and forms a guiding track for the slider, means for the rigid anchoring of the slider to the profiled element.

10 Claims, 7 Drawing Sheets

(56) References Cited

U.S. PATENT DOCUMENTS

| | | | | |
|---|---|---|---|---|
| 2,903,149 | A | * | 9/1959 | Turner .................. E05F 1/1058 |
| | | | | 217/60 E |
| 3,034,551 | A | * | 5/1962 | Klehr ....................... A45C 3/02 |
| | | | | 190/902 |
| 3,822,083 | A | * | 7/1974 | Zeamer .................... A45C 5/03 |
| | | | | 312/208.4 |
| 4,239,093 | A | | 12/1980 | Eubanks et al. |
| 4,448,292 | A | * | 5/1984 | Comfort .................. A45C 5/00 |
| | | | | 220/4.28 |
| 4,522,288 | A | * | 6/1985 | Wickman ............... A45C 13/34 |
| | | | | 190/117 |
| 6,082,545 | A | * | 7/2000 | Ford ..................... A63F 9/0001 |
| | | | | 220/520 |
| 2016/0183651 | A1 | * | 6/2016 | Tonelli ..................... A45C 5/03 |
| | | | | 190/110 |

FOREIGN PATENT DOCUMENTS

| | | | |
|---|---|---|---|
| GB | 331753 | A | 7/1930 |
| WO | 0108854 | A1 | 2/2001 |

* cited by examiner

PORTABLE CONTAINER AND ASSOCIATED COUPLING ASSEMBLY

CROSS-REFERENCE TO RELATED APPLICATIONS

This application is related to and claims the benefit of Italian Patent Application No. 102018000007515, filed on Jul. 26, 2018, the contents of which are herein incorporated by reference in their entirety.

TECHNICAL FIELD

The present disclosure relates to a portable container and to an associated coupling assembly.

BACKGROUND

As is known, it is possible to find commercially various types of portable containers, such as trunks, crates, suitcases, trolleys, backpacks and other products, which are differentiated by shape, dimensions, materials and/or functionality as well as intended use, type of goods that can be accommodated therein, and/or reference customers.

In one embodiment which is by now well established, these products comprise a pair of shell portions that have an open boxlike shape and are mutually articulated about a rotation axis which is arranged along respective adjacent edges. The shell portions can thus pass from a closed configuration, in which they delimit an internal compartment designed to accommodate the objects to be carried, to an open configuration, in which one of them is rotated and partially spaced from the other in order to allow access to the compartment, and vice versa.

The constructive solution outlined above is adopted in various contexts and different applications: in many of them, the need is often felt to ensure that the open configuration is maintained until the user intervenes directly, i.e., preventing accidental closure of the container. This occurrence can in fact inconvenience the user, forcing him to perform a further opening action.

Furthermore, it should be noted that in some contexts, especially of a professional kind, the shell portions are made of a material that is rigid and strong enough to ensure the capability to carry considerable weight and/or withstand even powerful impacts, without being deformed and most of all without compromising the integrity of the contents of the compartment.

In these cases, however, indeed because they are intended for the safe transport of delicate and/or heavy equipment, the weight and dimensions of the containers and of the shell portions in particular are often considerable.

Therefore, the need to prevent accidental closures is even more important, since the sudden and uncontrolled movement of one of the shell portions can lead to violent impacts against the other one, with consequent damage to the container and sometimes injuries to the user if fingers or hands inadvertently end up between the shell portions.

It is thus known to resort to a gas cylinder actuator, which comprises a cylinder inside which a piston supported by a respective stem can translate alternately. The free end of the stem is fixed to one shell portion while the cylinder is fixed at the opposite end to the other shell portion. Thus, the actuator not only contrasts the accidental closure of the container but also performs an additional function, applying in fact a force during transition from the closed configuration to the open configuration, in order to reduce the effort required by the user (and this is obviously greatly appreciated in particular for heavier containers).

However, this constructive solution is not free from drawbacks.

Especially in professional applications, when the containers are designed to accommodate electronic instruments or in any case equipment that is sensitive to dust, water and/or contaminations in general, an equally fundamental requirement is the capability to isolate hermetically the internal compartment in the closed configuration.

In order to ensure this functionality, and as also prescribed by some standards of the sector, it is not possible to provide holes along the shell portions, for example in order to insert therein screws, nails or the like.

However, these very elements would be necessary in order to be able to easily couple the stem and the cylinder of the actuator to the respective shell portions.

Manufacturing companies are therefore forced to resort to complicated solutions of various kinds in order to ensure coupling while complying with the sealing requirements.

Among these, one of the most widely adopted ones provides for fixing said components of the actuator to inserts to be inserted in adapted pockets provided along the walls of the shell portions.

Thus, screws or the like mutually join the inserts and the components of the actuator and the necessary holes can be provided in the inserts, without compromising the integrity of the shell portions. Moreover, it is often possible to use pockets that are in any case already provided in the shell portions, since there are used for the reference of other components.

Even this solution is in any case scarcely practical, since fixing can occur only at pockets that have already been provided and obviously cannot be modified or moved (except for deep reworking of the shell portions). Even if two or more pockets are available along the same wall, the number of potential fixing points is in any case limited, and so is, accordingly, the inclination and the lever arm of the actuator.

Vice versa, these parameters are fundamental in order to define and modulate the forces involved, and in particular the force with which said devices contrast accidental closure and/or facilitate opening, and therefore it would be essential to be able to vary them freely in order to adapt to the specific requirements.

It should be noted that the limitations described above are obviously all the more present when one wishes to convert an existing portable container, assigning pockets intended for other uses to the fixing of the actuator.

SUMMARY

The aim of the present disclosure is to solve the problems described above, providing a portable container that ensures practical methods for maintaining the open configuration against accidental closure.

Within this aim, an object of the disclosure is to provide an assembly that can be installed on a portable container in order to ensure practical methods of maintaining the open configuration against accidental closure.

Another object of the disclosure is to provide a portable container in which the open configuration is maintained with a solution that is versatile, easily adaptable, and adjustable as a function of the different requirements.

Another object of the disclosure is to provide an assembly that can be installed easily even on existing containers in order to ensure that the open configuration is maintained, in a practical and versatile manner.

Another object of the disclosure is to provide a portable container and an assembly that ensure high operating reliability.

Not least object of the disclosure is to provide a portable container and an assembly that adopt a technical and structural architecture that is alternative to those of portable containers of the known kind.

Another object of the disclosure is to provide a portable container and an assembly that have low costs, are safe in application and can be obtained easily starting from commonly commercially available elements and materials.

This aim and these and other objects which will become better apparent hereinafter are achieved by a container according to claim 1 and by an assembly according to claim 11.

BRIEF DESCRIPTION OF THE DRAWINGS

Further characteristics and advantages of the disclosure will become better apparent from the description of two preferred but not exclusive embodiments of the container and of the assembly according to the disclosure, illustrated by way of nonlimiting example in the accompanying drawings, wherein.

DETAILED DESCRIPTION OF THE DRAWINGS

With particular reference to FIGS. 1-10, the reference numeral 1 generally designates a portable container such as a suitcase, a trunk, a crate, a trolley, and the like.

More generically, it is specified from the outset that any reference that shall be made in the present description to containers 1 is to be understood as extending to any type of product (suitcases, trunks, crates, trolleys, or others) capable of accommodating objects and tools of various kinds, both for private use and for professional use.

Without abandoning the protective scope claimed herein, it is in fact possible to accommodate in the container 1 tools, equipment, electronic devices or others, in professional use, as well as clothes, objects of various kinds and personal items, in private use.

In the preferred application and in the accompanying figures, the container 1, for predominantly professional use, is a sort of rigid trunk, which is made of polymeric material with high impact resistance and provided with appropriate solutions which ensure its complete tightness and therefore the capability to prevent the entry of water, humidity, dust and contaminants in general. It is stressed in any case once again that the protective scope claimed herein refers also to other types of container 1, which may be rigid or not and are made of any material.

The portable container 1 comprises a first shell portion 2a and a second shell portion 2b which are mutually articulated (for example by means of respective hinges 3 installed proximate to corresponding adjacent edges of the related shell portions 2a, 2b).

Typically but not exclusively, both shell portions 2a, 2b are boxlike and can constitute the two halves (of equal size) of the outer shell that forms in practice the container 1, or can have shapes and dimensions (in particular height) which are mutually different, for example with a first shell portion 2a that is higher and the second shell portion 2b that acts as a lid.

The shell portions 2a, 2b can move between a configuration for closing an internal compartment 4 and at least one open configuration (the one of FIGS. 1 and 2) for free access to the compartment 4.

Usually but not exclusively, movement between the two configurations occurs by rotation of one of the shell portions 2a, 2b with respect to the other one, wherein this rotation is made possible indeed by the hinges 3.

A safety device 5 is coupled to the shell portions 2a, 2b, contrasts the accidental movement toward the closed configuration and therefore has the task of maintaining the open configuration (until the user intervenes directly).

According to the disclosure, the portable container 1 comprises an assembly 100 for coupling the device 5 at least to the first shell portion 2a.

As will be specified further hereinafter, both the container 1 and the assembly 100 are the subject matter of the present description and of the protection claimed herein.

It is specified furthermore that in the present description and in the accompanying figures the identification of the "first" shell portion 2a (and therefore of the "second" shell portion 2b) is entirely arbitrary, and each one of the two shell portions 2a, 2b can be defined in this manner without thereby abandoning the protective scope claimed herein.

In the accompanying figures, the expression first shell portion 2a identifies the lower shell portion, designed for resting on the ground, but the other upper one might also be defined in this manner: more generically, the assembly 100 can equally mutually couple the device 5 to any one of the shell portions 2a, 2b (its particularities, shown hereinafter, can in fact be used in any case for coupling to any one of them).

The assembly 100 is provided with at least two inserts 101, which are inserted stably in respective seats 6 which have a corresponding shape and are provided along a wall of the first shell portion 2a.

It should be noted right now that if the number of seats 6 is greater than two (such as for example in the accompanying figures), it is possible to use any two of them for the insertion of the inserts 101, thus providing a first possibility to vary the methods of coupling the device 5 to the first shell portion 2a.

The assembly 100 is furthermore provided with a slider 102 which is coupled to the device 5. Typically, and as also in the accompanying figures, the coupling between the slider 102 and the device 5 is of the rotatable type (a hinge coupling), but other constructive solutions are not excluded and are in any case within the protective scope claimed herein.

The assembly 100 is furthermore provided with a profiled element 103 which is rigidly supported by the inserts 101; the profiled element 103 forms a guiding track 104 for the slider 102, which thus can move normally along the track 104.

The assembly 100 is furthermore provided with means 105 for the rigid anchoring of the slider 102 to the profiled element 103, which can be activated at any position of the slider 102 along the track 104. It should be noted, therefore, that during assembly and before resorting to the means 105 it is possible to move the slider 102 along the track 104 and therefore the disclosure allows to vary freely and easily the position in which the device 5 mates with the first shell portion 2a (which is indeed determined by the position assumed by the slider 102 along the track 104). It is thus possible to vary in an equally free and easy manner the parameters related to the force that the device 5 generates in order to contrast the accidental closure of the container 1 (the movement toward the closure configuration) and in particular the inclination assumed by the device 5 and the lever arm.

The intended aim is therefore already achieved.

In particular, in the preferred embodiment, which in any case does not limit the application of the disclosure, the container 1 comprises two assemblies 100, in order to couple the device 5 (its respective mutually opposite parts) respectively to the first shell portion 2a and to the second shell portion 2b (with both shell portions 2a, 2b which are thus provided with respective seats 6, as in the accompanying figures).

With further reference to the preferred solution, which does not limit the application of the disclosure, the safety device 5 is a gas cylinder actuator, which comprises a cylinder 7 and a stem 8 which supports a respective piston, which can move with an alternating rectilinear motion within the cylinder 7 (in manners which are per se known).

If two assemblies 100 are provided, one of them is coupled to the end of the cylinder 7 that is opposite the stem 8 for coupling to the second shell portion 2b, while the other assembly 100 is coupled to the free end of said stem 8, for coupling to the first shell portion 2a.

When instead a single assembly 100 is provided, it can be equally entrusted with coupling the cylinder 7 or the stem 8 to any one of the shell portions 2a, 2b (coupling to the other shell portion 2a, 2b being obtained in another manner, even of a traditional type).

It is in any case useful to specify that the choice to resort to a gas cylinder actuator is only one of the possible embodiments of the device 5, which are in any case within the protective scope illustrated herein.

For example, in fact, the device 5 might be constituted by a caliper system of a per se known type, which comprises therefore two arms which are mutually articulated at respective adjacent ends: each one of the two arms can in fact be coupled at the opposite end to one of the shell portions 2a, 2b by means of the assembly 100, in the same manners described herein.

In particular, in the embodiment shown in the accompanying figures by way of nonlimiting example, each insert 101 comprises a block 106 that is substantially shaped like a parallelepiped and two lugs 107 which protrude in a parallel arrangement from opposite edges of a first face of the block 106. For the sake of simplicity, the reference numerals of the block 106 and of the lugs 107 have been shown only in FIGS. 5-8.

Thus, the insert 101 can be inserted in a respective seat 6, which has a transverse cross-section with a corresponding shape (as can be deduced clearly from FIGS. 1-4). The seat 6 can be, for example, a sort of pocket which is open toward the compartment 4.

Figure 1:
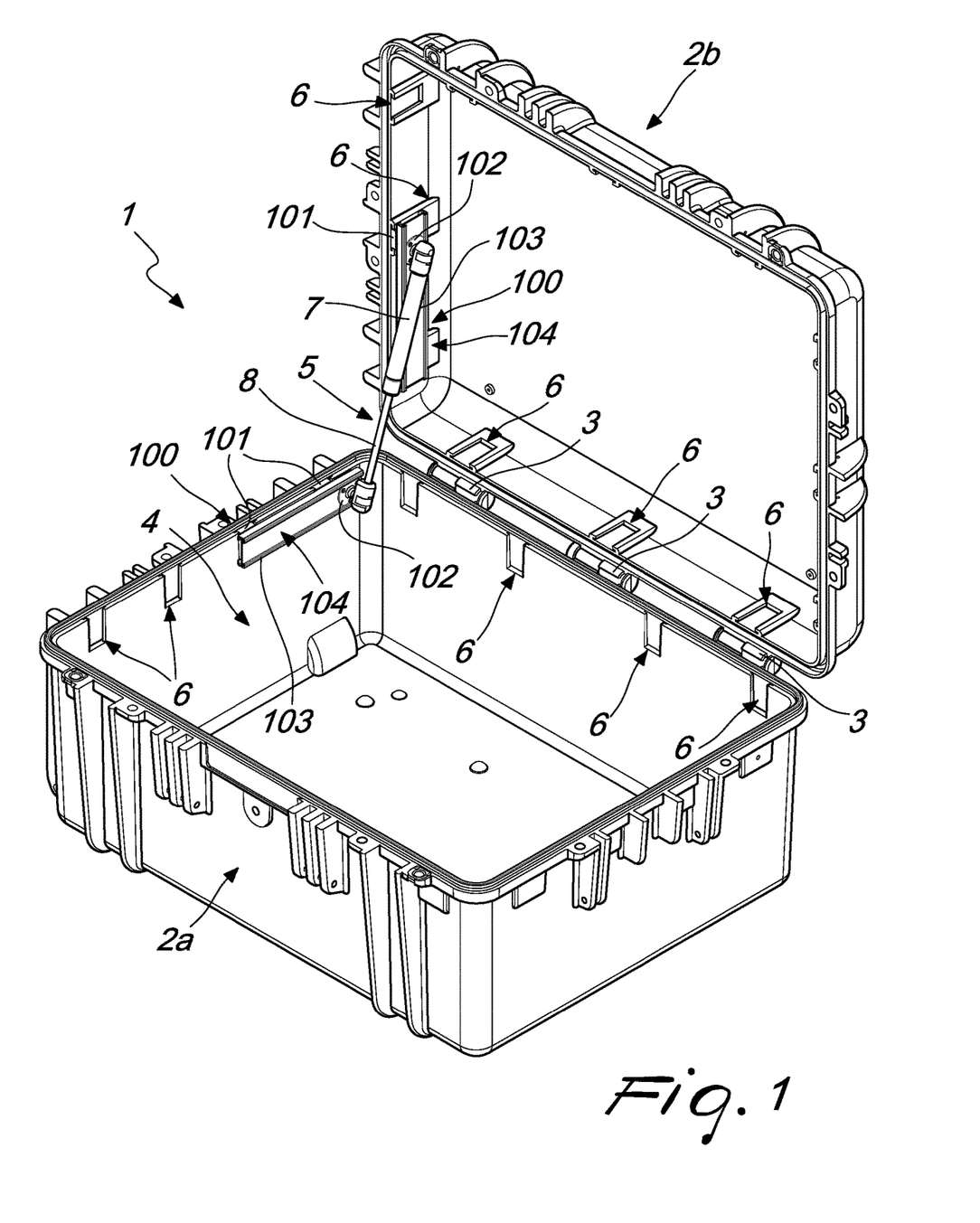
FIGS. 1 and 2 are perspective views, from two different angles, of the container and of the coupling assembly according to the disclosure in a first embodiment.
Figure 2:
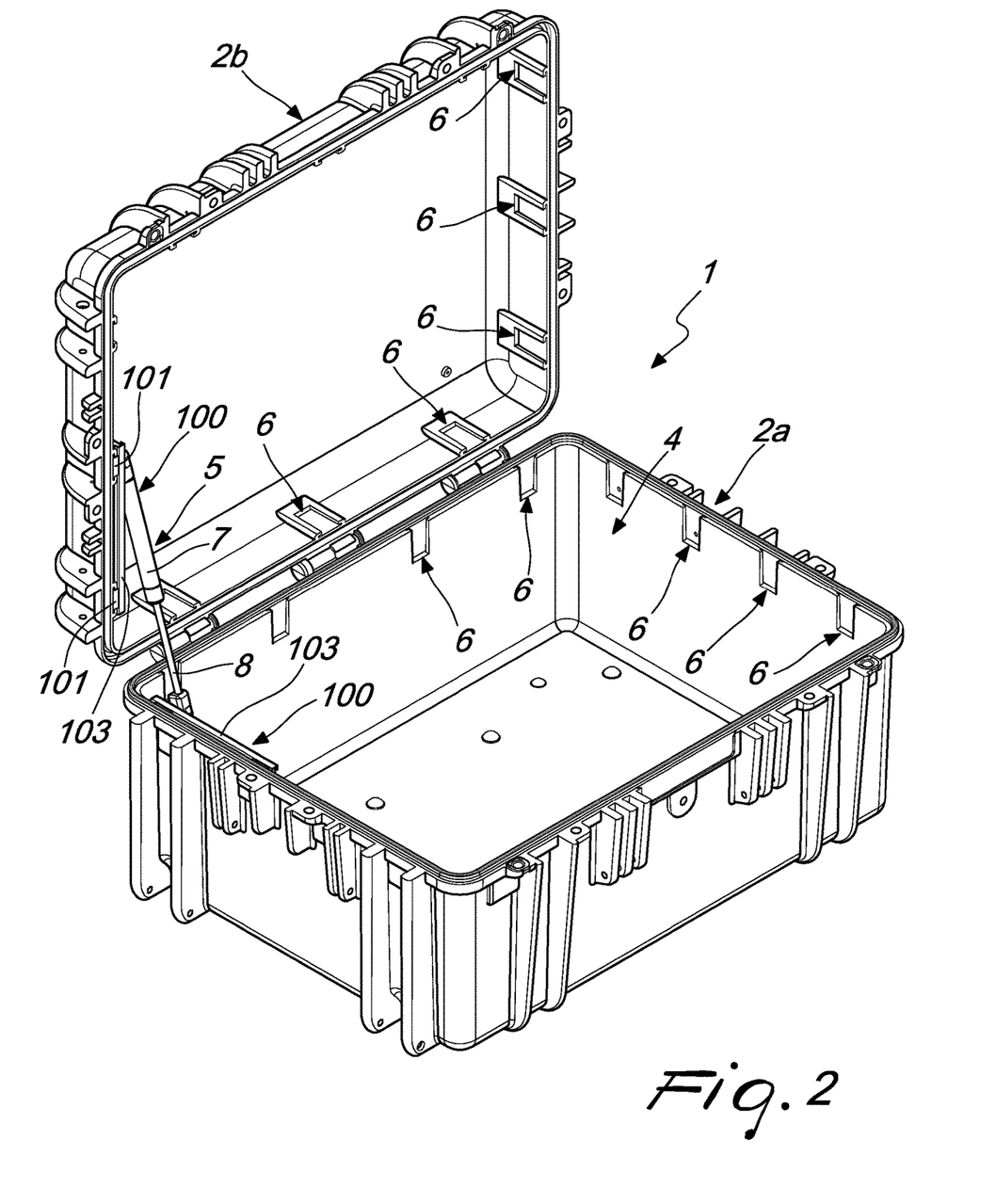
Figure 3:
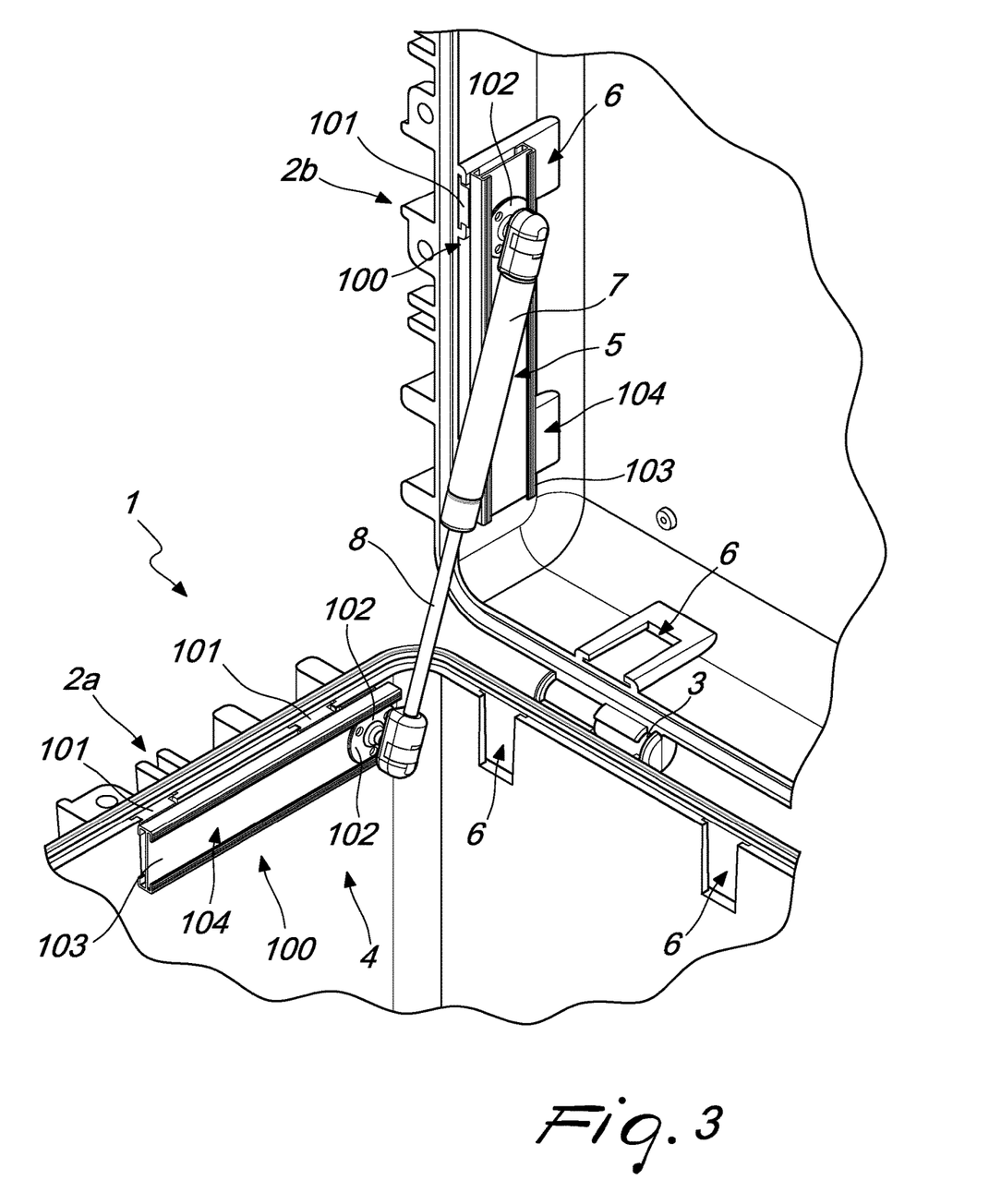
FIGS. 3 and 4 are highly enlarged-scale views of details of FIG. 1 and of FIG. 2 respectively.
Figure 4:
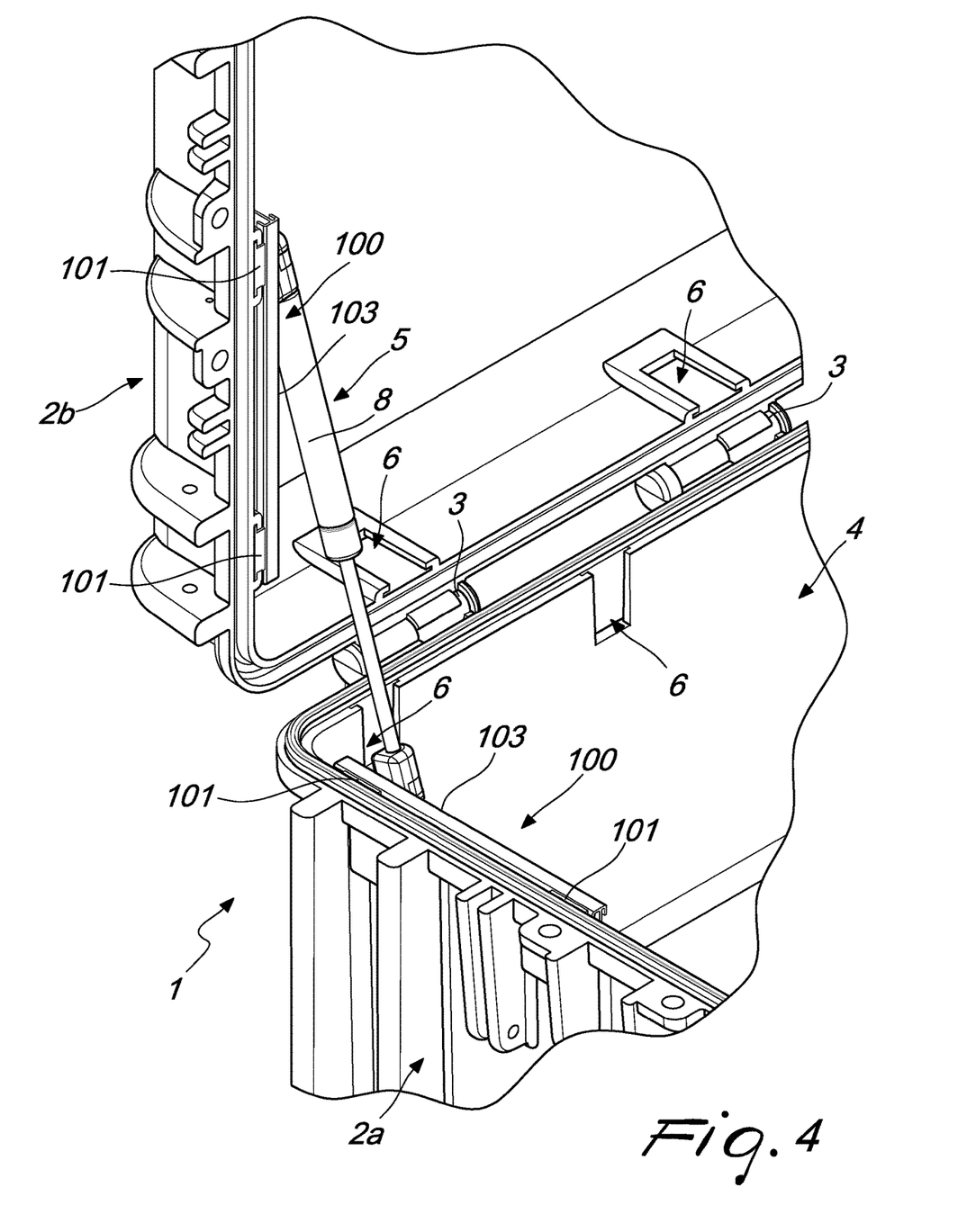
Figures 5, 6:
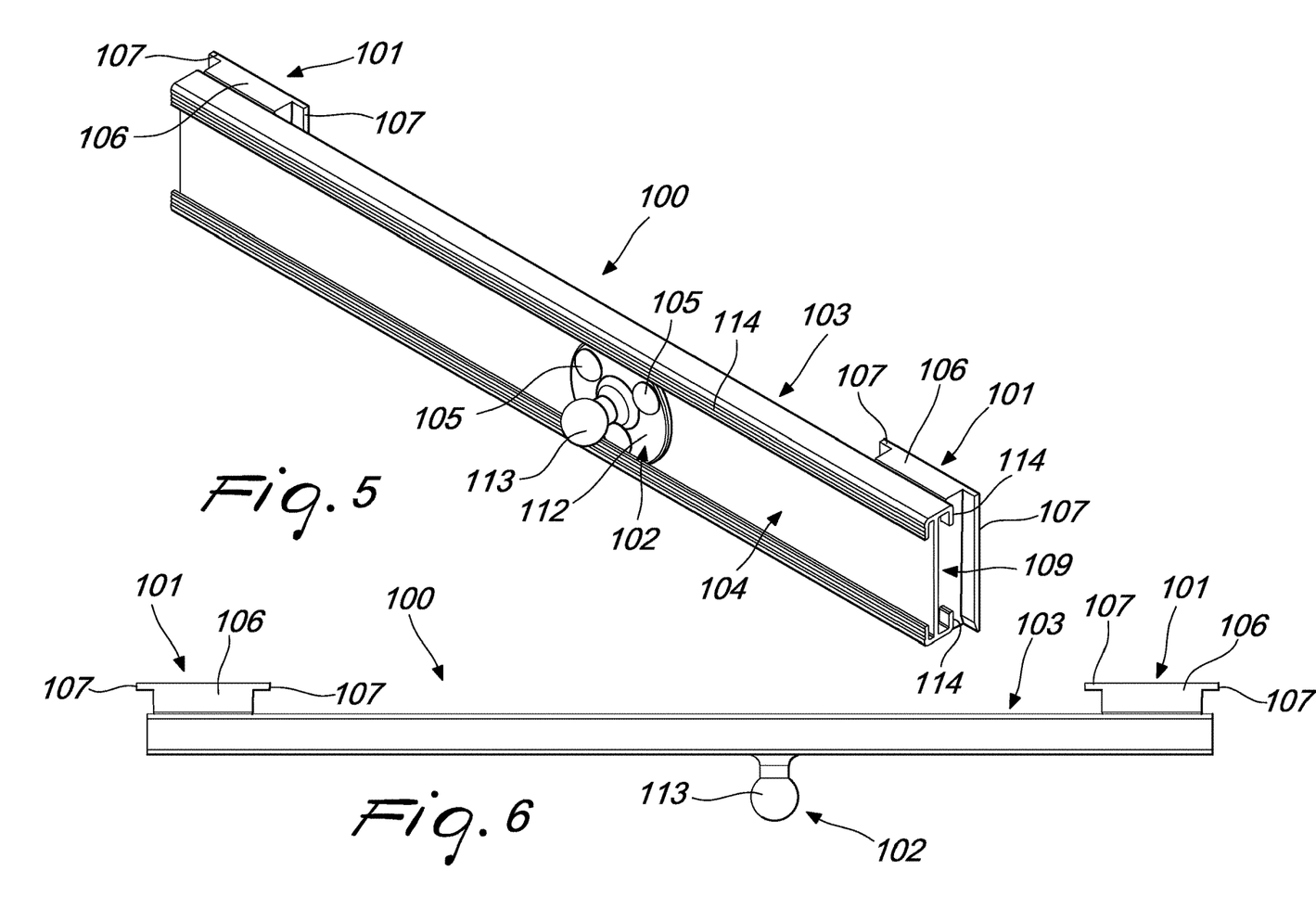
FIG. 5 is a perspective view of the coupling assembly of FIG. 1.
FIG. 6 is a top view of the coupling assembly of FIG. 1.
Figure 8:
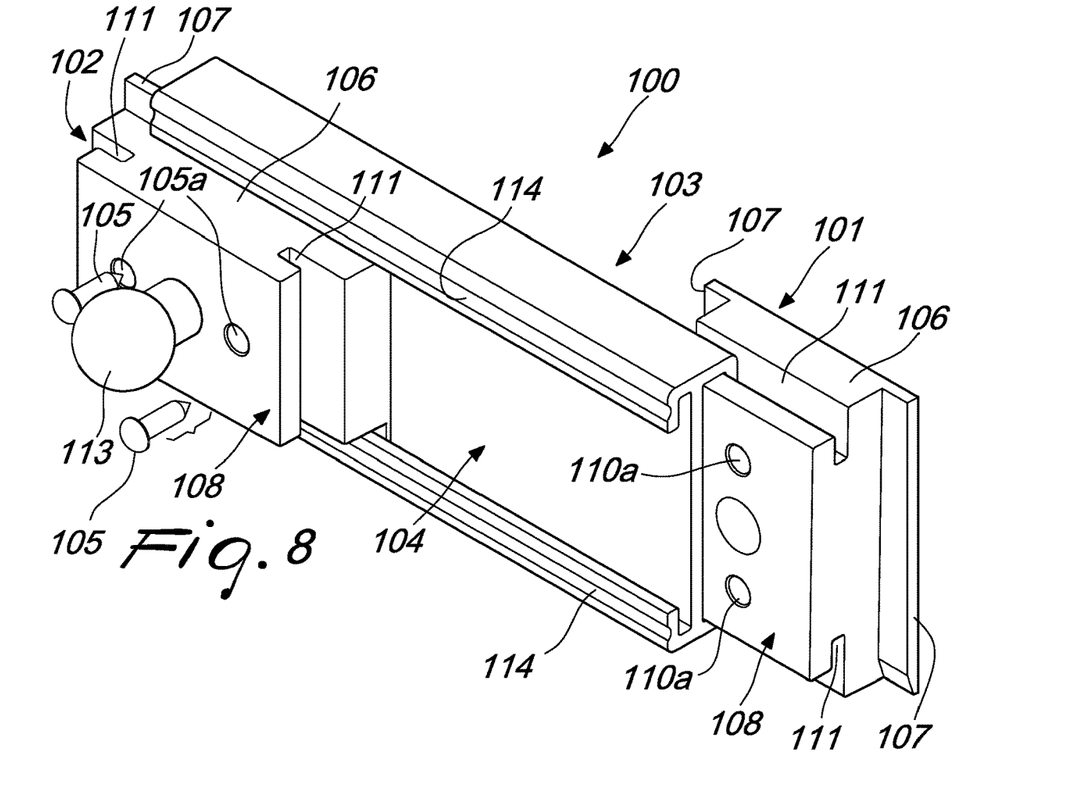
FIG. 8 is a perspective view of a second embodiment of the coupling assembly according to the disclosure.

Even more particularly, and as can be deduced in particular from FIGS. 5 and 8, each insert 101 comprises a contoured head 108, which can slide normally in a guiding rail 109 which has a corresponding transverse cross-section and is defined by the profiled element 103 on the opposite side with respect to the track 104.

Each insert 101 can be anchored rigidly to the profiled element 103 by means of respective rigid fixing elements 110, which can be activated at any relative position of the head 108 with respect to the rail 109.

By virtue of this particular constructive choice, during assembly and before using the elements 110 it is possible to move freely the profiled element 103 with respect to the inserts 101 inserted in the seats 6 (and therefore with respect to the shell portions 2a, 2b) until the relative position of the profiled element 103 with respect to the seats 6 that is most suited to the specific requirements is identified.

Figure 7:
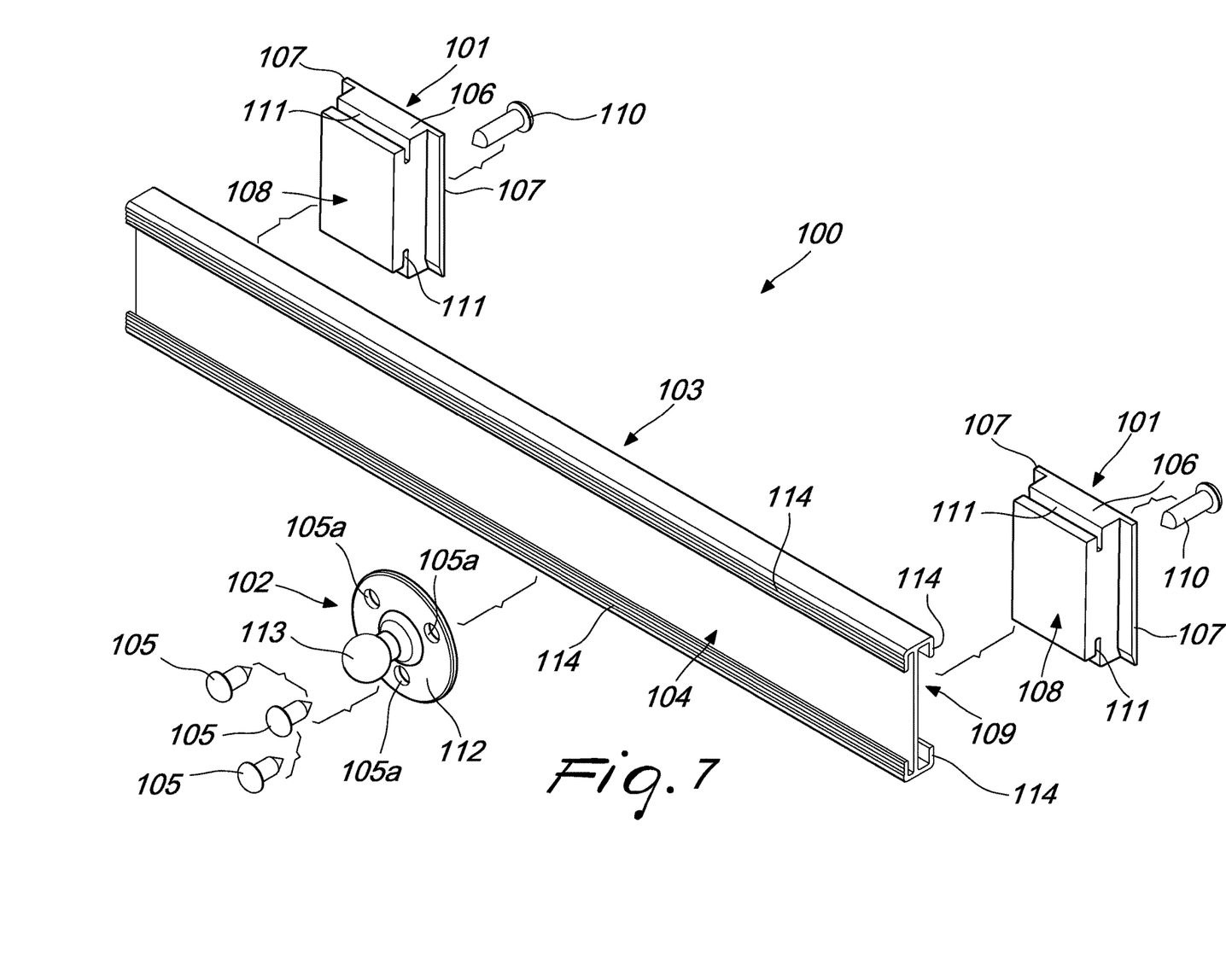
FIG. 7 is an exploded perspective view of the coupling assembly of FIG. 1.

Even more particularly, in the preferred but not exclusive embodiment, the head 108 has a T-shaped transverse cross-section and is formed by an end portion of the block 106, which has respective grooves 111 along corresponding second mutually opposite faces, which are contiguous to the already mentioned first face (FIGS. 7 and 8). In practice, therefore, the discontinuity formed along the second faces by the grooves 111 allows to form an end portion that has a T-shaped transverse cross-section for the block 106, which indeed forms the head 108 (and can have a transverse extension that is optionally different from the extension of the remaining portion of the block 106).

Usefully, in the embodiment of FIGS. 1-7, the slider 102 comprises a plate 112 which normally can slide within the track 104 and can be coupled to the profiled element 103 by virtue of said anchoring means 105. In the cited figures, the plate 112 has a disk-like shape but it can be given in any case a square, rectangular or other shape without thereby abandoning the protective scope claimed herein.

Furthermore, the slider 102 comprises a pivot 113 for rotatable coupling to the device 5, which extends from the plate 112. The rotatable coupling can be provided according to per se known methods and can provide for the pivot 113, which is substantially spherical, to enter rotatably a complementarily shaped cavity provided in the device 5 (in the cylinder 7 and/or in the stem 8, or in extensions associated therewith).

For the sake of simplicity, the reference numeral of the plate 112 has been shown only in FIGS. 5 and 7 and the reference numeral of the pivot 113 has been shown only in FIGS. 5-7.

Figures 9, 10:
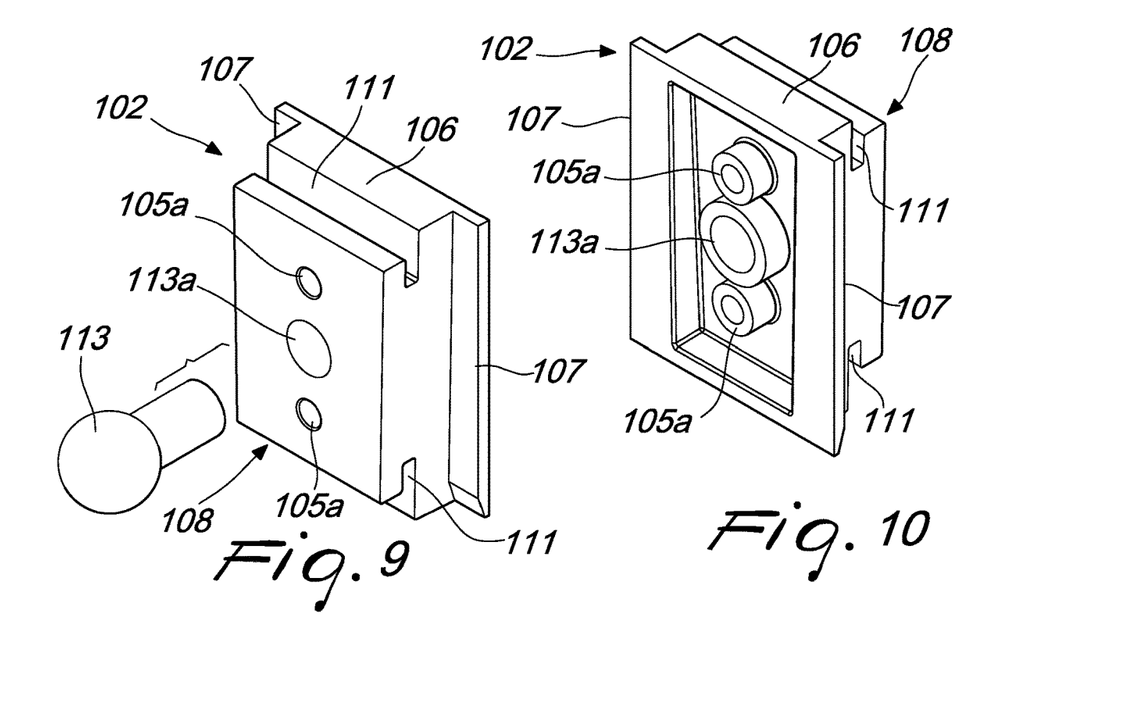
FIGS. 9 and 10 are respectively front and rear perspective views of the slider of the assembly of FIG. 8.

In a different embodiment, shown in FIGS. 8-10 without thereby exhausting the possibilities that are in any case included within the protective scope claimed herein, the slider 102 is constituted by an additional insert 101, which can move along the track 104 with an orientation that is perpendicular to the orientation assumed by the inserts 101 inserted in the respective seats 6.

In this last embodiment, therefore, the slider 102 comprises again a block 106 and two lugs 107, a contoured head 108 and grooves 111, as already noted for the inserts 101. Furthermore, in this case also the slider 102 can in any case provide a pivot 113, of the type described for the other embodiment, which can be inserted for example in a stable accommodation channel 113a.

This solution reduces the number of different components in the parts list, with obvious benefits in terms of logistics.

Advantageously, the anchoring means 105 and the fixing elements 110 are constituted by nails, screws, rivets, and/or similar rigid coupling units.

Positively, the means 105 and the elements 110 can be chosen of the same type, so as to contain the number of components in the parts list and simplify their supply and warehouse management.

The means 105 and the elements 110 can be inserted respectively in holes 105*a* (FIGS. 7-10) and in orifices 110*a* (FIG. 8) provided beforehand, or can simply perforate the slider 102 or the inserts 101, thus "building" their receptacle.

It should be noted in any case that the means 105 and the elements 110 interact with and/or merely pierce the inserts 101 and/or the sliders 102 without affecting in any way the corresponding wall of the shell portion 2*a*, 2*b*.

In the embodiment of the accompanying figures, which is a nonlimiting example of the disclosure, the profiled element 103 has a double T-shaped transverse cross-section and comprises respective protruding lips 114, which extend from respective sides of said profiled element 103, in order to define the track 104 and the rail 109.

For the sake of simplicity, the reference numeral of the lips 114 has also been shown only in FIGS. 5, 7 and 8.

As already anticipated, like the container 1, an assembly 100, designed to couple a shell portion 2*a*, 2*b* of a portable container 1 according to what has been observed so far to a safety device 5, is also a subject matter of the present disclosure (and of the protection claimed herein). The safety device 5 in turn is designed to contrast the accidental movement toward the closure configuration in order to maintain the open configuration.

The assembly 100 according to the disclosure therefore comprises one or more of the specifications illustrated in the preceding pages.

The operation of the container and of the assembly according to the disclosure is as follows.

In per se known manners, when the shell portions 2*a*, 2*b* are arranged in the closed configuration, they delimit a compartment 4 which can accommodate objects and tools of various kinds. In order to store them in the compartment 4 or remove them from it, it is sufficient to bring the shell portions 2*a*, 2*b* to the open configuration (or optionally to an intermediate configuration). Again in a per se known manner, the safety device 5 acts in the open configuration, contrasts accidental closure and prevents this from occurring unexpectedly, for example due to an impact on one of the shell portions 2*a*, 2*b*, generating obvious unwelcome consequences.

When it is instead the user who wishes to close the container 1, he can apply a force that is greater than the force generated by the device 5 or in any case deactivate it in some way.

When the device 5 is a gas cylinder actuator, it performs the additional useful function of aid during opening, since the force that it generates allows to ease the effort of the user to lift and rotate the corresponding shell portion 2*a*, 2*b*.

Within this scope, the container 1 offers practical and versatile methods of coupling the device 5 to one of the shell portions 2*a*, 2*b* and preferably to both.

As shown, in fact, first of all the inserts 101 can be inserted in two seats 6 provided along a wall of the shell portions 2*a*, 2*b*. Said seats 6 can be provided in the container 1 indeed to accommodate the inserts 101 or can be originally intended for other purposes and converted for this purpose, thus allowing to use the assembly 100 also on existing containers 1.

If the seats 6 are numerous, obviously this allows to choose freely the two most appropriate ones as a function of the position that one wishes the device 5 to assume.

It is therefore possible to anchor the profiled element 103 to the inserts 101, for example by first sliding the heads 108 of the inserts 101 in the rail 109 of the profiled element 103, until the chosen position for the latter is reached, to then obtain the rigid mutual coupling by means of the elements 110.

It should be noted that once the most appropriate seats 6 for the insertion of the inserts 101 have been identified (or, obviously, if only two are available), the choice to provide heads 108 that can slide in the rail 109 allows to vary at will the arrangement of the profiled element 103 with respect to the corresponding shell portion 2*a*, 2*b*. This evidently allows to vary the possible positions in which the coupling of the device 5 to said shell portion 2*a*, 2*b* can be provided (since, as shown, they correspond to the position of the slider 102 along the track 104 of the profiled element 103).

Moreover, if the possibilities offered by the track 104 supported by inserts 101 inserted in two specific seats 6 are not sufficient, it is possible to insert the inserts 101 in other seats 6, so as to shift the profiled element 103 (and obviously the track 104) with respect to the shell portion 2*a*, 2*b*, thus obtaining a new and different plurality of options available for coupling the device 5.

After anchoring the profiled element 103 to the inserts 101 (and therefore after coupling it to the shell portion 2*a*, 2*b*), it is possible to insert the slider 102 in the track 104 (for example, therefore, the plate 112 or the additional insert 101, rotated through 90° with respect to the others).

Once the desired position of the slider 102 along the profiled element 103 or of the inserts 101 with respect to the latter has been identified, during assembly it is possible to ensure mutual rigid coupling by virtue of nails, screws, rivets and/or similar rigid connection units or in any case by virtue of the means 105 and/or the elements 110.

In this case also, it is straightforward to note that this particular constructive choice allows to choose at will the point where the slider 102 is to be fixed.

Since after the slider 102 it is possible to couple the device 5, said device is coupled to the shell portion 2*a*, 2*b* in a position that is chosen at will, by virtue of the countless methods of adjustment offered by the possibility to slide the slider 102 in the track 104. This ensures great versatility to the disclosure, which is further increased, as shown, by the possibility of the heads 108 to slide in the rail 109, and by the free choice of the seats 6 into which the inserts 101 are to be inserted.

More generally, the simple activities described above (which can also be performed in a different order) ensure practical methods of maintaining the open configuration against accidental closure, since they allow to identify the arrangement for the device 5 that in each instance is most suitable for this purpose. The arrangement in fact determines corresponding values of the lever arm and in general of the forces involved, which are decisive indeed to ensure optimum retention of the open configuration.

It has been observed moreover that these results can be obtained effectively also on existing containers 1, in which the seats 6 have been provided beforehand and obviously cannot be moved, since the position of the slider 102 can in any case be modified freely.

In this context, moreover, since the heads 108 can slide within the rails 109, obtaining in any case a rigid mutual coupling between the inserts 101 and the profiled element 103, the device 5 can be coupled to the walls of the shell portion 2*a*, 2*b* even if the seats 6 have been provided beforehand and independently of their center distance.

Any provision of holes relates exclusively to the elements of the assembly 100, whereas the integrity of the shell portions 2a, 2b is maintained (and, with it, the seal and the compliance with the requirements of the standards).

The disclosure thus conceived is susceptible of numerous modifications and variations, all of which are within the scope of the appended claims; all the details may furthermore be replaced with other technically equivalent elements.

In the exemplary embodiments shown, individual characteristics, given in relation to specific examples, may actually be interchanged with other different characteristics that exist in other exemplary embodiments.

In practice, the materials used, as well as the dimensions, may be any according to the requirements and the state of the art.

What is claimed is:

1. A portable container comprising: a first shell portion and a second shell portion which are mutually articulated and are configured to move between a configuration for closing an internal compartment and at least one open configuration for free access to the compartment, a gas cylinder actuator being coupled to said shell portions and preventing accidental movement toward said closed configuration in order to maintain said open configuration, wherein the container further comprises an assembly for coupling said gas cylinder actuator to at least said first shell portion, said assembly including: at least two inserts which are stably inserted in respective seats having a corresponding shape which are provided along a wall of said first shell portion, a slider coupled to said gas cylinder actuator, a profiled element which is rigidly supported by said inserts and forms a guiding track for said slider, which is movable along said track, and anchoring means configured for the rigid anchoring of said slider to said profiled element configured to be activated at any position of said slider along said track.

2. The container according to claim 1, further comprising two of said assemblies, for the coupling of said gas cylinder actuator respectively to said first shell portion and to said second shell portion.

3. The portable container according to claim 1, wherein said gas cylinder actuator, which comprises a cylinder and a stem which supports a respective piston, configured to move with an alternating rectilinear motion within said cylinder.

4. The container according to claim 1, wherein each one of said inserts comprises a block that substantially has a parallelepiped shape and two lugs which protrude in a parallel arrangement from opposite edges of a first face of said block, for insertion in a respective said seat, which has a correspondingly shaped transverse cross-section.

5. The container according to claim 1, wherein each one of said inserts comprises a contoured head configured to slide in a guiding rail that has a corresponding transverse cross-section and is defined by said profiled element on the opposite side with respect to said track, each one of said inserts being rigidly anchorable to said profiled element using respective rigid fixing elements, configured to be activated at any relative position of said head with respect to said rail.

6. The container according to claim 1, wherein said head has a T-shaped transverse cross-section and is formed by an end portion of said block, which has respective grooves along corresponding second mutually opposite faces contiguous to said first face.

7. The container according to claim 1, wherein said slider comprises a plate configured to slide in said track and configured to be coupled to said profiled element by virtue of said anchoring means, and a pivot for rotatable coupling to said gas cylinder actuator, which extends from said plate.

8. The container according to claim 1, wherein said slider is constituted by an additional said insert configured to move along said track with an orientation that is perpendicular to the orientation assumed by said inserts inserted in the respective said seats.

9. The container according to claim 5, wherein said anchoring means and/or said fixing elements are constituted by nails, screws, rivets, or rigid connection units.

10. The container according to claim 5, wherein said profiled element has a double T-shaped transverse cross-section and comprises respective protruding lips which extend from respective sides in order to define said track and said rail.

* * * * *